United States Patent
Lowmaster et al.

(10) Patent No.: US 7,406,158 B2
(45) Date of Patent: Jul. 29, 2008

(54) METHOD AND SYSTEM FOR PLAYING PACKETIZED ANNOUNCEMENTS TO TELEPHONE NETWORK END OFFICE SWITCHING SYSTEMS FROM A CENTRALIZED DIGITAL RECORDED ANNOUNCEMENT UNIT

(75) Inventors: Robert Lowmaster, Bartlett, IL (US); Sidney L. Underwood, Garden Ridge, TX (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 188 days.

(21) Appl. No.: 10/383,745

(22) Filed: Mar. 10, 2003

(65) Prior Publication Data
US 2004/0179658 A1    Sep. 16, 2004

(51) Int. Cl.
*H04M 1/64* (2006.01)
(52) U.S. Cl. ..................... 379/88.17; 379/84
(58) Field of Classification Search ............... 379/67.1, 379/76, 84, 88.16, 88.17, 88.18, 221.01, 379/229, 201.01
See application file for complete search history.

(56) References Cited

U.S. PATENT DOCUMENTS

| | | | |
|---|---|---|---|
| 5,056,086 A | 10/1991 | Libonati | 370/259 |
| 5,839,068 A | 11/1998 | Simmons | 455/427 |
| 5,864,614 A | 1/1999 | Farris et al. | 379/221.09 |
| 5,940,493 A * | 8/1999 | Desai et al. | 379/260 |
| 5,995,596 A * | 11/1999 | Shaffer et al. | 379/88.18 |
| 6,035,018 A | 3/2000 | Kaufman | 379/88.17 |
| 6,108,706 A | 8/2000 | Birdwell et al. | 709/229 |
| 6,182,045 B1 | 1/2001 | Kredo et al. | 704/270 |
| 6,195,714 B1 | 2/2001 | Li et al. | 370/352 |
| 6,252,952 B1 | 6/2001 | Kung et al. | 379/114.1 |
| 6,259,771 B1 * | 7/2001 | Kredo et al. | 379/88.17 |
| 6,385,196 B1 | 5/2002 | Hayball et al. | 370/356 |
| 6,392,999 B1 | 5/2002 | Liu et al. | 370/260 |
| 6,396,908 B1 * | 5/2002 | O'Donovan et al. | 379/88.18 |
| 6,396,917 B1 * | 5/2002 | Brush et al. | 379/201.12 |
| 6,430,175 B1 | 8/2002 | Echols et al. | 370/352 |
| 6,496,508 B1 | 12/2002 | Breuckheimer et al. | 370/397 |
| 6,665,379 B1 * | 12/2003 | Brown et al. | 379/88.18 |
| 7,340,043 B2 * | 3/2008 | Crockett et al. | 379/88.17 |
| 2002/0101974 A1 * | 8/2002 | Zbib | 379/221.02 |
| 2003/0007625 A1 * | 1/2003 | Pines et al. | 379/223 |

(Continued)

OTHER PUBLICATIONS

"Announcement Server Solutions", <http://www.convedia.com/solutions/solutions_annoucements.html>,obtained no later than Dec. 20, 2002.

(Continued)

*Primary Examiner*—Fan Tsang
*Assistant Examiner*—Simon Sing
(74) *Attorney, Agent, or Firm*—Greenblum & Bernstein, P.L.C.

(57) ABSTRACT

A centralized recorded announcement unit shared by multiple end offices on a public switched telephone network stores announcements in digital files. When a call is received at a switch and an announcement is required, the announcement is played to the caller by an announcement device if the particular announcement file is stored locally. If the announcement is not stored locally, a request is sent to the centralized recorded announcement unit to retrieve the announcement file and play the announcement to the caller. Both the request and the announcement file are sent via a packed-switched network.

23 Claims, 4 Drawing Sheets

U.S. PATENT DOCUMENTS

2004/0247093 A1* 12/2004 Potts et al. ............... 379/88.17

OTHER PUBLICATIONS

"Clarent® Announcement Server", http://www.clarent.com/pdf/CANS_1201.pdf>, obtained no later than Dec. 20, 2002.

"Intelligent Network Services Administration System", <http://www.tid.es/presencia/publicaciones/comsid/ing/articulos/vol171/admini/admini.html>, obtained no later than Dec. 20, 2002.

Radvision: MGCP Overview, <http://www.esoft.com./tw/products/radvision/mgcp.html>, obtained no later than Jan. 22, 2003.

Telcordia™ Call Agent, <http://www.telcordia.com/products_services/networksystems/softswitch/brochure_call_agent_mc-ngn-br-003.pdf>, obtained no later than Jan. 22, 2003.

* cited by examiner

METHOD AND SYSTEM FOR PLAYING PACKETIZED ANNOUNCEMENTS TO TELEPHONE NETWORK END OFFICE SWITCHING SYSTEMS FROM A CENTRALIZED DIGITAL RECORDED ANNOUNCEMENT UNIT

BACKGROUND OF THE INVENTION

1. Field of the Invention

The present invention is related to the field of telecommunications. More particularly, the present invention relates to the distribution of voice announcements from a centralized recorded announcement platform to a plurality of end office switches.

2. Acronyms

The written description contains acronyms that refer to various telecommunications services, components and techniques, as well as features relating to the present invention. Although some of these acronyms are known, use of these acronyms is not strictly standardized in the art. For purposes of the written description, acronyms will be defined as follows:

Adaptive Differential Pulse Code Modulation (ADPCM)
Advanced Intelligent Network (AIN)
Asynchronous Transfer Mode (ATM)
Asynchronous Transfer Mode Gateway (ATMG)
Basic Rate Interface (BRI)
Carrier AIN (CAIN)
Dual Tone Multi-Frequency (DTMF)
Integrated Services Digital Network (ISDN)
Intelligent Peripheral Announcement Device (IPAD)
Internet Protocol (IP)
Local Area Network (LAN)
Media Gateway (MG)
Media Gateway Control Protocol (MGCP)
Network Facility Access (NFA)
Open Systems Interconnection (OSI)
Primary Rate Interface (PRI)
Public Switched Telephone Network (PSTN)
Pulse Code Modulation (PCM)
Service Control Point (SCP)
Service Switching Point (SSP)
Session Initiation Protocol (SIP)
Signaling System 7 (SS7)
Speech Activated Intelligent Dialing (SAID)
Time Division Multiplexing (TDM)
Transmission Control Protocol/Internet Protocol (TCP/IP)
Voice Over IP (VoIP)
Wide Area Network (WAN)

3. Background and Material Information

Telephone service providers provide voice announcements to subscribers in support of its services and to assist in call processing. The voice announcements are recorded voice files that are installed at each end office switch. That is, each particular recorded voice announcement must be duplicated or installed on each end office switch. To do so requires a substantial amount of time and resources from a manpower and hardware perspective.

With new services being offered frequently, flexibility in provisioning announcements is crucial. This is especially true with respect to the delivery and marketing of subscription and pay per use services. Moreover, an increasing segment of the population would appreciate announcements in a language other than English. Unfortunately, installing new announcements or changing existing announcements is very difficult to coordinate on a company wide basis, given the number of end office switches involved. Attempts at improving this process have proved unsatisfactory.

Therefore, it would be advantageous to implement a centralized digital recorded announcement system employing high speed transmission technology that would permit the provisioning of voice announcements quickly and inexpensively.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

The present invention relates to a method and system for the distribution of voice announcement files from a shared recorded announcement unit to end office switches via a packet-switched network. As defined herein, a packet-switched network includes a transport medium adapted to carry, for example, internet protocol (IP) packets, asynchronous transfer mode (ATM) cells, and frame relay frames.

In view of the above, the present invention through one or more of its various aspects and/or embodiments is presented to accomplish one or more objectives and advantages, such as those noted below.

Accordingly, one aspect of the invention is to provide a recorded announcement unit that stores digitally recorded announcements in the form of announcement files. The announcement files are transported to an announcement device at end office switches using internet protocol packets, asynchronous transfer mode cells, or frame relay frames.

Another aspect of the present invention is to provide a method of delivering at least one recorded announcement to a caller at an end office switch in a public switched telephone network. The method includes receiving a call at the switch, determining which announcement to play to the caller, receiving an announcement from a recorded announcement unit via a packet-switched network, and playing the announcement to the caller.

The method may also include storing the announcement in a memory of an announcement device. Further, the method may include sending a request to the recorded announcement unit for the announcement. The method may also include converting the announcement from a first format to a second format. A determination may also be made as to whether the announcement is stored in a memory of the announcement device, which may be an intelligent peripheral.

The announcement is received via internet protocol packets, asynchronous transfer mode cells, or frame relay frames at the switch, which may include a class 5 switch. Further, the announcement may be received via a voice over IP packet-based communication.

The method includes an announcement device that plays the announcement to the caller, in which the switch and the announcement device may communicate via an announcement trunk or a line interface. With respect to an announcement trunk, the communications may include multi-frequency in-band signaling, signaling system 7 signaling, or D-channel signaling over primary rate interface ISDN. With respect to a line interface, the communications may include DTMF signaling or D-channel signaling over basic rate interface ISDN. Alternatively, a software bridging arrangement may be provisioned between the switch and the announcement device, or the switch and the announcement device may communicate via an advanced intelligent network interface.

The method may further include sending a request from the switch to a telephone number at an announcement device, in which the telephone number is associated with the announcement. Still further, a specific identifier to identify a particular announcement may be associated with each announcement.

Another aspect of the present invention is to provide a method of delivering at least one announcement file from a recorded announcement unit to be played to a caller at an end office switch in a public switched telephone network. The method includes storing announcement files on the recorded announcement unit, receiving a request, via a packet-switched network, from an announcement device to send at least one announcement file to the announcement device, and sending the announcement file to the announcement device via a packet-switched network.

The announcement device may include an intelligent peripheral. Further, the announcement file is sent in the form of internet protocol packets, asynchronous transfer mode cells, or frame relay frames.

Another aspect of the present invention is to provide a centralized recorded announcement system for playing announcements to a caller at an end office switch in a public switched telephone network. The system includes a recorded announcement unit to store recorded announcements digitally in a file, end offices connected to the recorded announcement unit, and an announcement device at each end office that is configured to receive announcement files over a packet-switched network and play at least one announcement to the caller.

The announcement files may be received in the form of internet protocol packets, asynchronous transfer mode cells, or frame relay frames. The announcement device, which may be an intelligent peripheral, may convert a received announcement file from a first format to a second format and may store announcement files in a memory. The recorded announcement unit may send an announcement file to the announcement device in response to a request from the announcement device. Also, a processor may be included to store announcement files on the recorded announcement unit.

According to another aspect of the present invention, a data signal is provided that is propagated on a propagation medium that transports at least one recorded announcement file from a recorded announcement unit to an announcement device at an end office switch in a public switched telephone network. The data signal includes internet protocol signaling, asynchronous transfer mode signaling, or frame relay signaling.

Figure 1:
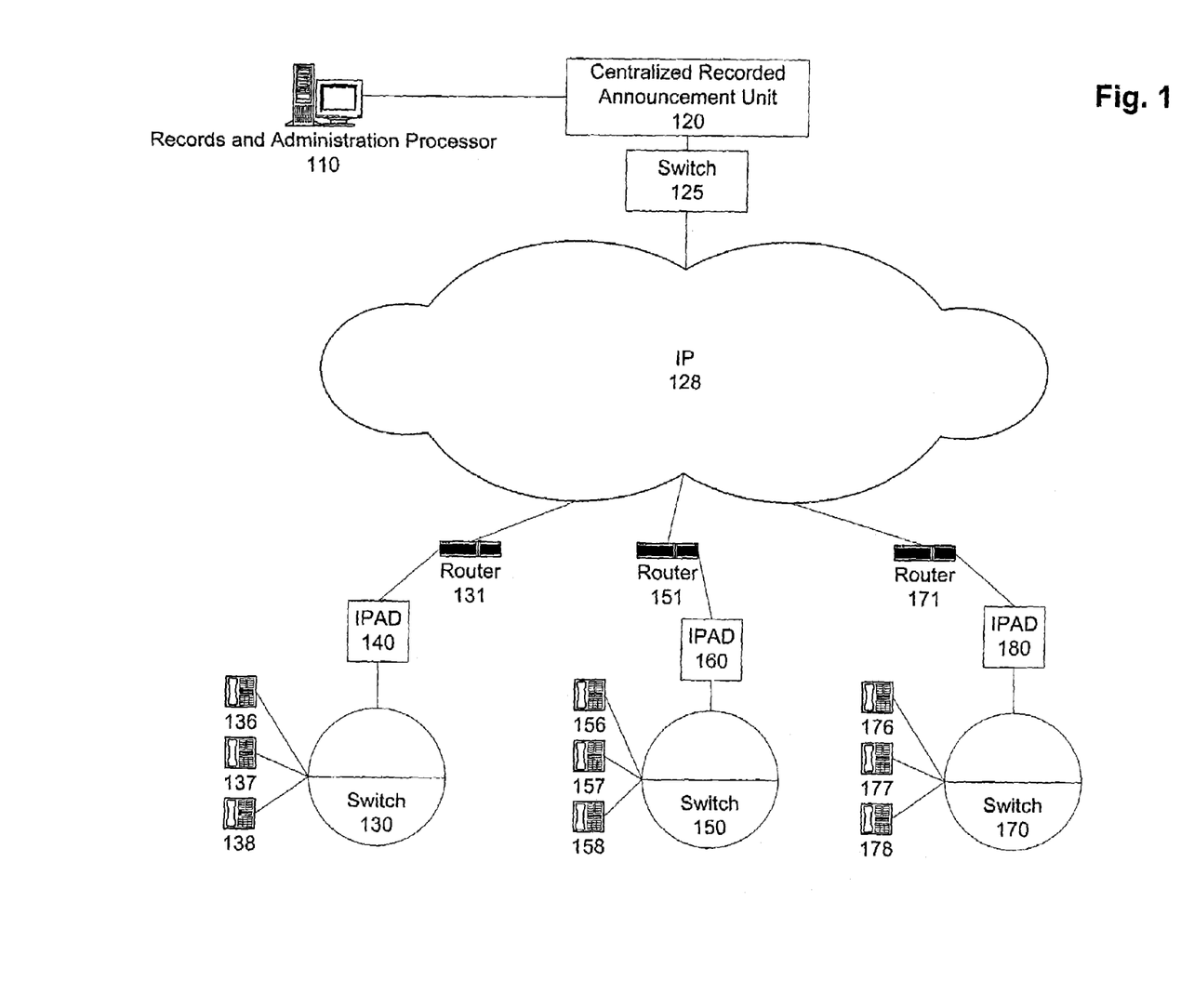
FIG. 1 is a block diagram showing an exemplary telecommunications network, according to an aspect of the present invention.

FIG. 1 is a block diagram showing an exemplary telecommunications network, according to an aspect of the present invention. The telecommunications network 100 includes a records and administration processor 110, a centralized recorded announcement unit 120, a switch 125, an IP network 128, end office switches 130, 150, 170, IP routers 131, 151, 171, calling stations 136, 137, 138, 156, 157, 158, 176, 177, 178, and intelligent peripheral announcement devices (IPADs) 140, 160, 180. Each of the IPADs 140, 160, 180 include a media gateway (MG), which will be discussed later.

The records and administration processor 110 is a processor/server operating an announcement management interface that is used to store digital announcement files on the centralized recorded announcement unit 120 and/or the IPADs 140, 160, 180. An exemplary records and administration processor includes an IBM compatible computer running the Windows operating system. The announcement files stored at the centralized recorded announcement unit 120 are a collection of announcements that the service provider plays to callers. The announcements may be digitally stored in formats such as WAV, MP3, G.711 (i.e., pulse code modulation (PCM)), G.726 (i.e., adaptive differential pulse code modulation (AD-PCM)), or suitable equivalents. An exemplary centralized recorded announcement unit includes the Harmony 6000 available from IP Unity.

Typically, the records and administration processor 110 is operated by a telephone service provider. The records and administration processor 110 communicates with the centralized recorded announcement unit 120 via a suitable network, e.g., local area network (LAN), wide area network (WAN), etc. An exemplary switch 125 comprises a layer 2 or layer 3 switch according to open systems interconnection (OSI) standards and connects the centralized recorded announcement unit 120 to the IP network 128. For example, an exemplary switch used for the switch 125 includes a Black Diamond available from Extreme Networks. The IP network may include any network capable of routing IP packets via transmission control protocol/internet protocol (TCP/IP), such as a WAN.

The end office switches 130, 150, 170, also referred to as central office switches, include switches or service switching points (SSPs), and specifically, class 5 switches. It is noted that the terms end office and end office switch will be used interchangeably herein. Exemplary switches include, for example, 1AESS or 5ESS switches manufactured by Lucent Technologies, Inc. (Lucent); DMS-100 or DMS-250 switches manufactured by Nortel Networks Corporation (Nortel); AXE-10 switches manufactured by Telefonaktiebolaget LM Ericsson, or EWSD switches available from Siemens Information and Communication Networks, Inc. If the end offices include SSPs in an advanced intelligent network (AIN) environment, then the switches may utilize an AIN Release 0.2 protocol or a Carrier AIN (CAIN) protocol. The end offices 130, 150, and 170 are connected to the centralized recorded announcement unit 120 via the IP network 128 through IP routers 131, 151 and 171 and media gateways in the IPADs 140, 160, 180, respectively. An exemplary IP router includes the RS Platform available from Riverstone Networks.

The IP routers 131, 151, and 171 route and deliver IP packets between the centralized recorded announcement unit 120 and the IPADs 140, 160, and 180 over the IP network 128. An exemplary IPAD includes the Convedia Corporation CMS-1000 announcement server, having a telephony interface and application software. The telephony interface recognizes the signaling across the particular interface employed for communications between end offices and respective IPADs. For instance, the telephony interface would recognize the D-channel if primary rate interface (PRI ISDN) (as will be discussed later) is used. Similar recognition functionality is provided with other interfaces that will be discussed later. The application software uses the signaling to recognize an announcement ID to thereby select and play the appropriate announcement.

Media gateways in the IPADs 140, 160, 180 operate the media gateway control protocol or session initiation protocol (SIP) and bridge the circuit-based public switched telephone network (PSTN) used by the end offices 130, 150, and 170 and the IP based-network used by the centralized recorded announcement unit 120. An exemplary media gateway includes the Cisco 3660 router available from Cisco Systems, Inc.

The end office 130 serves calling stations 136, 137, and 138; the end office 150 serves calling stations 146, 147, and 148; and the end office 170 serves calling stations 176, 177, and 178. Each end office 130, 150, 170 is connected to IPADs 140, 160, 180, respectively, via interface lines or trunks. In one embodiment, the IPADs 140, 160, 180 are located in the central office facility where the switches reside.

While only three end offices are shown for the sake of illustration, it is clear that additional end offices may be included. Further, the following description will discuss the arrangement with respect to only one end office; however, the arrangement applies to the other end offices as well.

When a caller places a telephone call from the calling station 136, the call is received at the end office 130. A determination is made as to whether an announcement is required to be played to the caller calling from the calling station 136. It is clear that in some instances a set of announcements is required to be played to a caller. Thus, by referring to an announcement it is assumed that a set of announcements may be included. For example, some announcements requiring interaction with the caller include nested messages or sub-menus.

In one embodiment, the end office 130 employs switch translations that define the conditions under which an announcement is to be played to caller, as well as which announcement is to be played to the caller, based upon call processing instructions at the switch 130. That is, if the switch 130 recognizes that a particular announcement is to be played to a caller, then the switch will seize a line interface or trunk channel and send the request to play the announcement to the IPAD 140 using appropriate signaling (as will be discussed below). In one embodiment, the switch 130 sends the request to a telephone number at the IPAD 140 associated with the desired announcement.

The IPAD 140 recognizes the seizure by the switch 130 and recognizes which announcement is to be played based on the signaling sent by the switch 130. At this point, the IPAD 140 determines whether the requested announcement is stored locally. That is, if the IPAD 140 has the announcement in its own memory, it will play the announcement to the caller at calling station 136 over the line interface or announcement trunk. However, if the IPAD 140 determines that it does not have the required announcement in memory, then a request, in the form of an IP message for example, is sent to the centralized recorded announcement unit 120 via the IP router 131, over the IP network 128. The request sent by the IPAD 140 includes an announcement ID to identify the appropriate announcement and a source address corresponding to the switch 130 and/or IPAD 140.

Upon receiving a request for a specific announcement from the IPAD 140 via the IP network 128 and the switch 125, the centralized recorded announcement unit 120 obtains the required announcement from its database and sends the announcement file to the IPAD 140 via the IP network 128 and the IP router 131. The transmission of the announcement file is sent from the centralized recorded announcement unit 120 to the IPAD 140, for example, as an IP message or as an attachment to an IP message. Upon receipt of the file, the IPAD 140 converts the file into a standard telephony format such as the G.711 format, the standard for encoding telephone audio on a 64 kbps channel, if it does not already reside in that format. Then the announcement file would be played to the caller over a line interface or announcement trunk interfacing the IPAD 140 to the end office 130.

In an alternative embodiment, the IPAD 140 sends an IP message to the centralized recorded announcement unit 120 requesting the desired announcement. In response, the centralized recorded announcement unit 120 converts the announcement file to voice over IP (VoIP) packets and sends the VoIP packets across the network 128 to the IPAD 140. Then, the IPAD 140 converts the VoIP packets to time division multiplexing (TDM) voice and the announcement is played to the calling station 136.

It is noted that the end office 130 may also connect a dual tone multi-frequency (DTMF) receiver to the caller at the calling station 136 to collect a caller response, when such response is expected, as in response to an interactive announcement. The DTMF receiver may be a stand alone unit, or may be integrated with the IPAD 140. It is further noted that the end office 130 may retain announcement playing functionality with respect to some announcements, e.g., tones, busy signals, "call cannot be completed as dialed" announcements, etc.

As mentioned, the IPAD 140 may store announcement files in an internal or external memory, including a cache memory. For example, the IPAD 140 may store recently played announcements in a cache memory in order to reduce the number of announcement retrievals from the centralized recorded announcement unit 120. In another alternative arrangement, the IPAD 140 may store all announcements required for serving the calling stations 136, 137, 138 associated with the switch 130. With this arrangement, the announcements stored at the IPAD 140 would be provisioned and updated from the centralized recorded announcement unit 120 using the records and administration processor 110 as necessary.

As mentioned, the end office 130 communicates with the IPAD 140 via a line interface or announcement trunk. The communications with a line interface include DTMF signaling, or D-channel signaling over a basic rate interface (BRI) integrated services digital network (ISDN). The communications via announcement trunk includes multi-frequency in-band signaling, signaling system 7 (SS7) signaling, or D-channel signaling over PRI ISDN.

In an alternative embodiment, a suitable software bridging arrangement may be provisioned between the end office 130 and the IPAD 140, while still leaving the end office 130 in control of the call. This arrangement may be implemented via a network facility access (NFA) generic interface. For example, speech activated intelligent dialing (SAID) may be used with Nortel DMS-100 switches and AIProxy may be used with Lucent 5ESS switches.

Rather than relying upon the aforementioned switch translations, an AIN configuration may be used such that when a call is received at the end office 130, an AIN trigger in the switch 130 causes the call to be suspended and a query to be sent to a service control point (SCP) requesting instructions on the handling of the call. As a result, the SCP sends a message to the end office 130 with instructions that an announcement is required for the particular call, including at least one parameter identifying the required announcement, e.g., an announcement ID. Then, the end office 130 seizes a line or trunk channel and sends the request to the IPAD 140 using appropriate signaling. Once the IPAD 140 recognizes the seizure and announcement required to be played from the end office 130, the processing is the same as discussed with respect to the switch translations embodiment. The AIN interface utilizes, for example, GR-1129 signaling over PRI ISDN.

Figure 2:
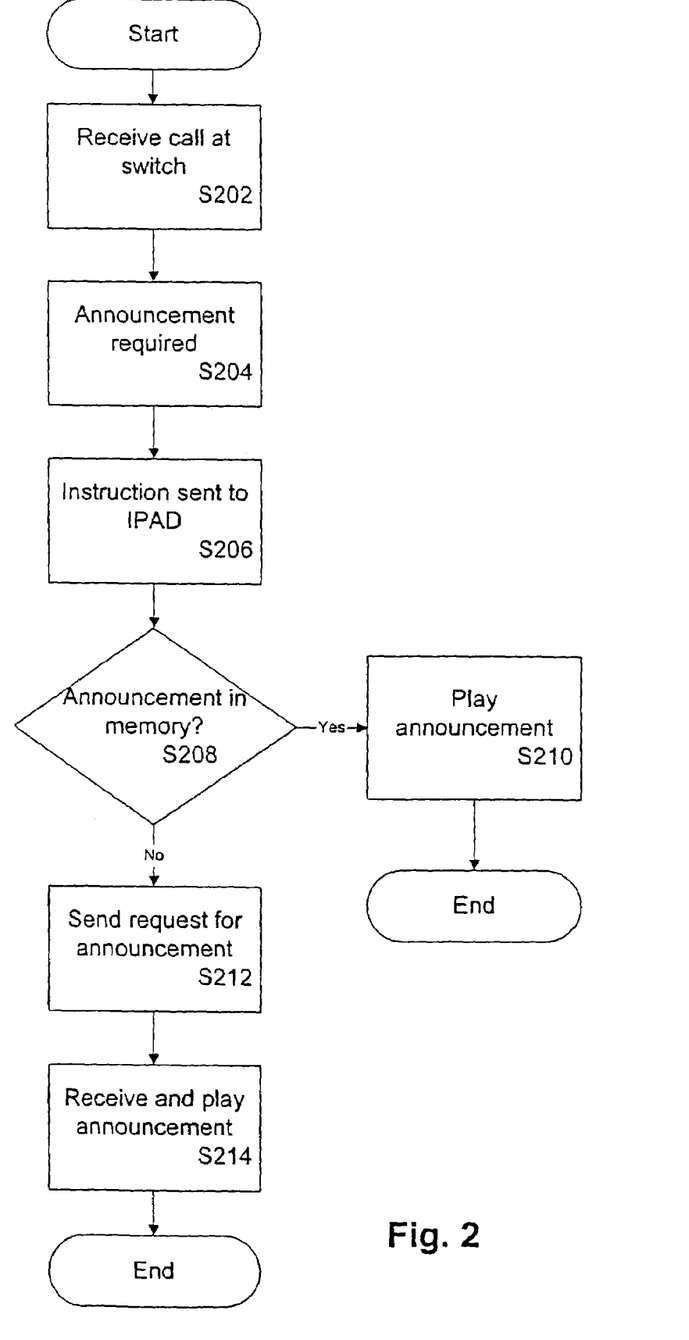
FIG. 2 is an exemplary flow diagram, according to an aspect of the present invention.

FIG. 2 is an exemplary flow diagram, according to one aspect of the present invention. At step S202, a call is received at the end office 130 from the calling station 136. At step S204, the end office 130 determines that a particular announcement, or set of announcements, is required to be played to the caller at the calling station 136. For example, this determination is made using switch translations or AIN SCP processing. At step S206, the end office 130 sends an instruction to the IPAD 140 to play a particular announcement to the caller at calling station 136. This instruction is sent via a line interface or an announcement trunk as discussed with respect to FIG. 1. At step S208, the IPAD 140 determines whether the announcement resides in memory at the IPAD 140. If it is determined that the announcement is stored or cached at the IPAD 140, then the IPAD 140 begins playing the announcement to the caller at step S210. Thereafter, the call may be routed or disconnected as appropriate.

If it is determined at step S208 that the announcement is not stored in a memory at the IPAD 140, then the IPAD 140 sends a request to the centralized recorded announcement unit 120 at step S212 over the IP network 128. This request is sent via the router 131 and the switch 125. In response, the centralized recorded announcement unit 120 retrieves the requested announcement and transmits the announcement to the IPAD 140 as an IP message or as an attachment to an IP message. Then, at step S214 the IPAD 140 receives the requested announcement file from the centralized recorded announcement unit 120 and plays the announcement to the caller. If the announcement file is received, for example as a WAV or an MP3 file, then the IPAD 140 may convert the file into a standard telephony format such as the G.711 format. This conversion process would also take place at step S214, prior to playing the announcement to the caller. After step S214, the call may be routed or disconnected as appropriate.

Figure 3:
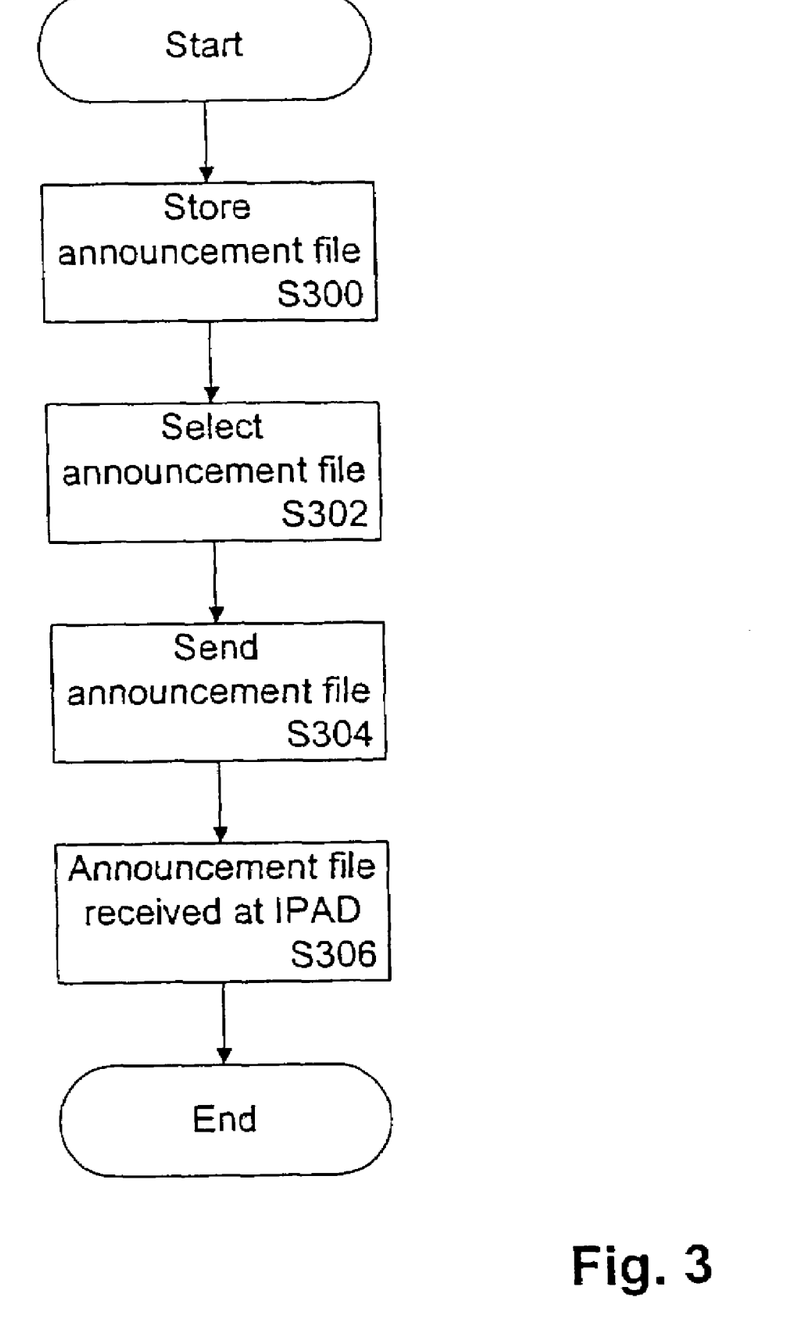
FIG. 3 is an exemplary flow diagram, according to an aspect of the present invention.

The process of provisioning a voice announcement will now be discussed with respect to FIG. 3. FIG. 3 is an exemplary flow diagram, according to an aspect of the present invention. At step S300, a representative of the service provider stores announcement files on the centralized recorded announcement unit 120 through an announcement management interface residing on the records and administration processor 110. This function may be accomplished by any known process. As a result, the centralized recorded announcement unit 120 is provisioned with a database of recorded voice announcements stored in a format such as a WAV, MP3, G.711, G.726, or suitable equivalents. Each recorded voice announcement has an associated identifier, such as announcement ID, by which it is identified.

At step S302, using the announcement management interface on the records and administration processor 110, the representative selects the particular announcement file that is to be stored on the IPAD 140. This selection is accomplished via a known process such as entering the announcement ID or highlighting the announcement ID from a group of announcement IDs, using a mouse, keyboard or other technique. At step S304, the representative instructs that the desired announcement be sent to the IPAD 140 over the IP network 128. It is noted that certain announcements may be applicable only to certain end offices, in which case only those announcements will the respective IPADs as determined by the representative.

In any event, the announcement file is sent from the centralized recorded announcement unit 120 to the IPAD 140 over the IP network 128. At step S306, the IPAD 140 receives and stores the announcement file. If necessary, the IPAD 140 converts the file into a standard telephone format.

Figure 4:
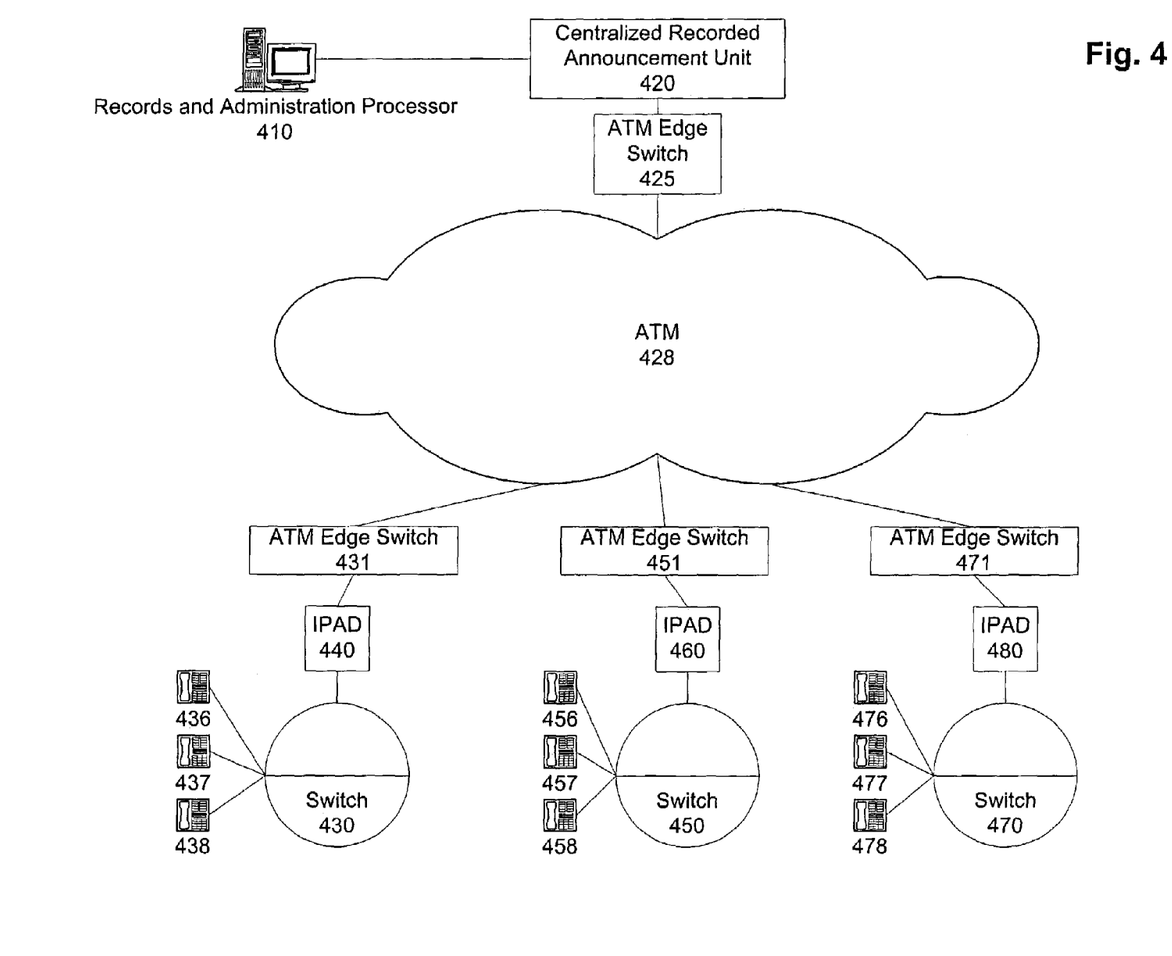
FIG. 4 is a block diagram showing an exemplary telecommunications network, according to an aspect of the present invention.

In an alternative arrangement, the network over which the announcement files are transmitted between the centralized recorded announcement unit 120 and the IPADs may be an ATM network. FIG. 4 is a block diagram showing an exemplary telecommunications network, according to an aspect of the present invention. A discussion of similar elements from FIG. 1 will not be repeated.

As shown, an ATM network 428 is provided to transfer announcement files from the centralized recorded announcement unit 120 to the IPAD 440. As is known, ATM is a networking technology that contains a flexible multiplexing and switching technique that provides high bandwidth over LANs and WANs using packets in the form of cells. As shown in FIG. 4, an ATM edge switch 425 provides access from the centralized recorded announcement unit 420 to the ATM network 428, while ATM edge switches 431, 451, 471 provide access from each of the IPADs 440, 460, 480 to the ATM network 428. An exemplary ATM edge switch includes the CBX 500 switch available from Lucent Technologies, Inc.

An ATM gateway (ATMG) resides within each of the IPADs 440, 460, 480 and bridges the circuit-based PSTN used by the end offices 430, 450, and 470 and the ATM-based network used by the centralized recorded announcement unit 420. An exemplary ATM gateway includes the G6 available from General Bandwidth, Inc.

Further, the present invention is not limited to IP networks or ATM networks. For instance, known elements inherent to frame relay transport (e.g., a frame relay access device) that use packets in the form of frames made be readily substituted if a frame relay network is employed in lieu of an IP network or an ATM network. In any event, a method and system are provided that facilitate quick and inexpensive provisioning of voice announcements.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission (e.g., IP, ATM, frame relay) and public telephone networks (e.g., AIN, SS7) represent examples of the state of the art. Such standards are periodically superseded by faster or more efficient equivalents having essentially the same functions. Accordingly, replacement standards and protocols having the same functions are considered equivalents.

What is claimed:

1. A method of providing at least one recorded announcement at an end office switch in a public switched telephone network, the method comprising:
   receiving a call from a caller at the switch;
   determining which of a plurality of announcements to play to the caller, the determination being made at the switch;
   determining whether the announcement that is determined to be played to the caller is stored in a memory of an announcement device;
   sending a request from the announcement device to a centralized recorded announcement unit for the determined announcement in response to a determination that the determined announcement is not stored in the memory of the announcement device;
   receiving the determined announcement from the recorded announcement unit via a packet network; and
   playing the determined announcement to the caller.

2. The method according to claim 1, further comprising storing the determined announcement in a memory of an announcement device.

3. The method according to claim 1, further comprising converting the determined announcement from a first format to a second format.

4. The method according to claim 1, wherein the announcement device comprises an intelligent peripheral.

5. The method according to claim 1, wherein the determined announcement is received in the form of internet protocol packets, asynchronous transfer mode cells, or frame relay frames.

6. The method according to claim 1, wherein the switch comprises a class 5 switch.

7. The method according to claim 1, wherein the receiving further comprises receiving the determined announcement via a voice over IP packet-based communication.

8. The method according to claim 1, wherein the announcement device plays the determined announcement to the caller.

9. The method according to claim 8, wherein the switch and the announcement device communicate via an announcement trunk.

10. The method according to claim 9, wherein the communications via the announcement trunk are one of multi-frequency in-band signaling, signaling system 7 signaling, and D-channel signaling over primary rate interface ISDN.

11. The method according to claim 8, wherein the switch and the announcement device communicate via a line interface.

12. The method according to claim 11, wherein the communications via the line interface are one of DTMF signaling and D-channel signaling over basic rate interface ISDN.

13. The method according to claim 8, wherein a software bridging arrangement is provisioned between the switch and the announcement device.

14. The method according to claim 8, wherein the switch and the announcement device communicate via an advanced intelligent network interface.

15. The method according to claim 1, wherein an identifier is associated with each of the plurality of announcements.

16. A method of providing at least one announcement file from a centralized recorded announcement unit, to be played to a caller, at an end office switch in a public switched telephone network, the method comprising:
   storing a plurality of announcement files on the recorded announcement unit, each announcement file comprising a digitally recorded announcement;
   receiving a request from an announcement device to send the at least one announcement file to the announcement device in response to a determination that the at least one announcement file is not stored in a memory of the announcement device, the determination of which of the plurality of announcement files stored on the recorded announcement unit to be played to the caller having been made at the end office switch, the request being received via a packet network; and
   sending the at least one announcement file to the announcement device via the packet network.

17. The method according to claim 16, wherein the announcement device comprises an intelligent peripheral.

18. The method according to claim 16, wherein the at least one announcement file is sent in the form of internet protocol packets, asynchronous transfer mode cells, or frame relay frames.

19. A centralized recorded announcement system for playing announcements to a caller in a public switched telephone network, the system comprising:
   a centralized recorded announcement unit configured to store recorded announcements, each announcement being digitally stored in a file;
   a plurality of end offices connected to the recorded announcement unit, each of the plurality of end offices being configured to determine the announcements to play to the caller; and
   an announcement device at each of the plurality of end offices configured to receive announcement files comprising digitally recorded announcements over a packet network and configured to play at least one announcement to the caller, each of the announcement devices having a memory,
   wherein the recorded announcement unit sends an announcement file to at least one of the announcement devices in response to a request from the at least one of the announcement devices when a determination is made that an announcement to be played to the caller is not stored in the memory of the announcement device.

20. The system of claim 19, wherein the announcement device converts an announcement file from a first format to a second format.

21. The system of claim 19, further comprising a processor configured to store announcement files on the recorded announcement unit.

22. The system of claim 19, wherein the announcement device comprises an intelligent peripheral.

23. The system of claim 19, wherein the announcement files are received in the form of Internet protocol packets, asynchronous transfer mode cells, or frame relay frames.

* * * * *